US006912244B2

(12) United States Patent
Challa et al.

(10) Patent No.: US 6,912,244 B2
(45) Date of Patent: Jun. 28, 2005

(54) PILOT FREQUENCY ACQUISITION BASED ON A WINDOW OF DATA SAMPLES

(75) Inventors: Raghu Challa, San Diego, CA (US); Mark Charles Roh, San Diego, CA (US); Shimman Patel, San Diego, CA (US)

(73) Assignee: Qualcomm Inc., San Diego ( * ) Notice: Subject to any disclaimer, the term of this patent is extended or adjusted under 35 U.S.C. 154(b) by 0 days.

(21) Appl. No.: 10/356,296

(22) Filed: Jan. 30, 2003

(65) Prior Publication Data

US 2003/0143951 A1 Jul. 31, 2003

Related U.S. Application Data

(60) Provisional application No. 60/353,479, filed on Jan. 31, 2002.

(51) Int. Cl.[7] .............................. H04B 1/69; H04B 1/707
(52) U.S. Cl. ........................ 375/149; 375/147; 375/326; 375/344; 375/355
(58) Field of Search ................................ 375/145–147, 375/324, 149, 326, 344, 355, 372; 370/329, 331, 335, 342, 504; 455/161.2, 434

(56) References Cited

U.S. PATENT DOCUMENTS

| | | | | | |
|---|---|---|---|---|---|
| 5,428,647 | A | * | 6/1995 | Rasky et al. ................. | 375/366 |
| 5,692,006 | A | * | 11/1997 | Ross .......................... | 375/147 |
| 6,266,365 | B1 | * | 7/2001 | Wang et al. ................. | 375/150 |
| 6,505,058 | B1 | * | 1/2003 | Willey ........................ | 455/574 |
| 6,522,702 | B1 | * | 2/2003 | Maruyama ................... | 375/324 |
| 6,639,907 | B2 | * | 10/2003 | Neufeld et al. ............. | 370/342 |
| 2001/0028677 | A1 | * | 10/2001 | Wang et al. ................. | 375/148 |
| 2003/0067898 | A1 | * | 4/2003 | Challa et al. ............... | 370/335 |

FOREIGN PATENT DOCUMENTS

| | | | |
|---|---|---|---|
| JP | 11308158 | 11/1999 | |
| WO | 0065797 | 11/2000 | |
| WO | WO 0065797 | * 11/2000 | ......... H04L/27/233 |
| WO | 0154445 | 7/2001 | |
| WO | 0176097 | 11/2001 | |

OTHER PUBLICATIONS

Kajiwara A., et al. Spread Spectrum Demodulator Using Block Signal Processing 1991 IEEE pp. 0894–0898.

* cited by examiner

*Primary Examiner*—Young T. Tse
*Assistant Examiner*—Edith Chang
(74) *Attorney, Agent, or Firm*—Philip R Wadsworth; Charles D Brown; Timothy F Loomis

(57) ABSTRACT

Techniques to acquire the frequency of a signal instance based on a window of data samples covering a time period shorter than the time needed to achieve frequency lock. The window of data samples is initially captured and stored to a sample buffer. A segment of data samples is then retrieved from the sample buffer for processing. The retrieved data samples are rotated by a current frequency error estimate to provide frequency-translated data samples, which are further processed to provide one or more pilot symbols. An updated frequency error estimate for the frequency-translated data samples is then derived based on the pilot symbols using a frequency control loop. The window of data samples is processed for a number of iterations until frequency acquisition is achieved for the signal instance or termination is reached. For each iteration, one segment is processed at a time and typically in sequential order.

25 Claims, 6 Drawing Sheets

PILOT FREQUENCY ACQUISITION BASED ON A WINDOW OF DATA SAMPLES

This application claims the benefit of provisional U.S. application Ser. No. 60/353,479, entitled "Pilot Frequency Acquisition Based on a Window of Data Samples," filed on Jan. 31, 2002, assigned to the assignee of the present application, and incorporated herein by reference in its entirety for all purposes.

BACKGROUND

1. Field

The present invention relates generally to data communication, and more specifically to techniques for acquiring the frequency of a pilot in a wireless (e.g., CDMA) communication system based on a window of data samples.

2. Background

Wireless communication systems are widely deployed to provide various types of services such as voice, data, and so on. These systems may be based on code division multiple access (CDMA), time division multiple access (TDMA), frequency division multiple access (FDMA), or some other multiple access techniques. CDMA systems may provide certain advantages over other types of system such as increased system capacity. A CDMA system is typically designed to conform to one or more standards, such as IS-95, IS-2000, IS-856, W-CDMA, and TS-CDMA standards, all of which are known in the art and incorporated herein by reference.

A terminal in a CDMA system needs to acquire signals transmitted from one or more base stations in order to receive or exchange data. In many CDMA systems, a pilot is transmitted from each base station to assist the terminals perform a number of functions. The pilot is typically generated based on a known data pattern (e.g., a sequence of all zeros) and using a known signal processing scheme. The pilots from the base stations may be used at the terminals for acquisition, frequency and timing synchronization, channel estimation, coherent data demodulation, and so on.

The acquisition of a pilot is made challenging due to various phenomena. First, the pilot is distorted by noise and interference in the communication link, which can make detection of the pilot difficult at a terminal. Second, the received signal at the terminal typically includes multiple pilot instances at various amplitudes, phases, and delays due to a multipath environment. Third, since the terminal may not be certain of its frequency relative to that of the system, the received signal may be downconverted with a frequency error that needs to be determined and corrected before demodulation and other processing may be performed. Fourth, for certain situations such as when processing a quick paging channel (QPCH), the data of interest may reside in short bursts, and only a window of data samples covering a short time period may be available for pilot acquisition.

There is therefore a need in the art for techniques to acquire a pilot in a wireless (e.g., CDMA) communication system based on a window of data samples.

SUMMARY

Techniques are provided herein to acquire the frequency of a given signal instance based on a window of data samples covering a time period shorter than the time needed by a frequency control loop to achieve frequency lock. This allows certain portions of the terminal (e.g., the front-end unit) to be powered up for a shorter period of time, e.g., just long enough to capture the data samples. The data samples may thereafter be processed "offline", with unnecessary circuitry such as the front-end circuitry being powered down to reduce power consumption and provide other benefits.

A specific embodiment provides a device operable to acquire the frequency of a signal instance received in a (e.g., CDMA) communication system. A window of data samples that includes the signal instance to be acquired may be initially captured and stored to a sample buffer. This window may cover a time period that is shorter than the time required to achieve frequency acquisition.

The device includes a rotator and a frequency control loop. The rotator receives a segment of data samples (which is a portion of the data sample window) and rotates the data samples in accordance with a current frequency error estimate to provide frequency-translated data samples. The frequency-translated data samples may be processed (e.g., despread, decovered, and accumulated) to provide one or more pilot symbols for the segment. The frequency control loop then derives an updated frequency error estimate based on the pilot symbols. In one embodiment, the frequency-translated data samples are stored back to the sample buffer in place of the received data samples. In another embodiment, the frequency-translated data samples are not stored back to the sample buffer. The window of data samples is processed a number of times until frequency acquisition is achieved for the signal instance or termination is reached. For each iteration through the data sample window, one segment of data samples is processed at a time and typically in a sequential order from the start to the end of the data sample window.

Various aspects and embodiments of the invention are described in further detail below. The invention further provides methods, program codes, digital signal processors (DSPs), receiver units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
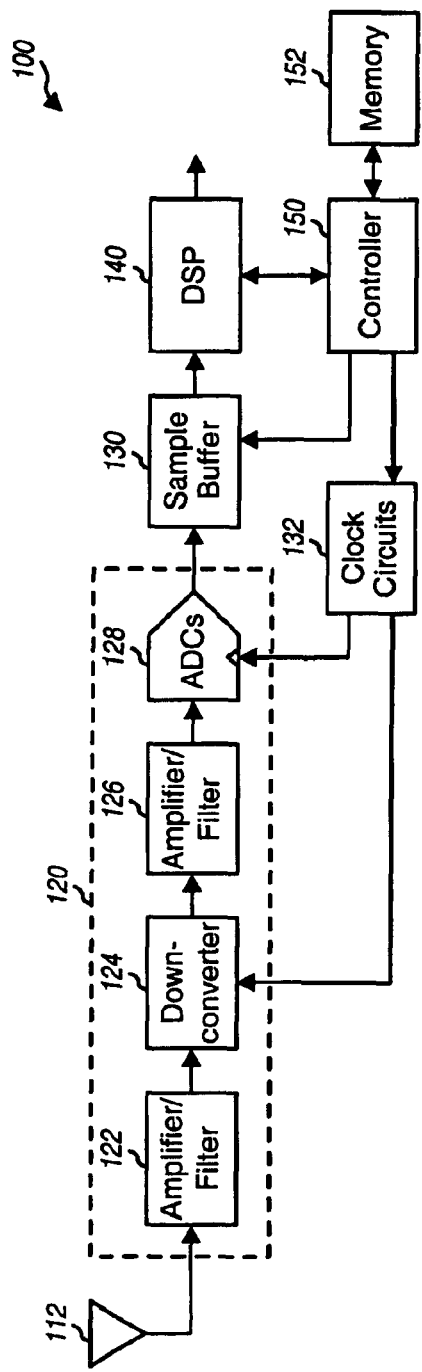
FIG. 1 is a block diagram of an embodiment of a receiver unit capable of implementing various aspects and embodiments of the invention.

FIG. 1 is a block diagram of an embodiment of a receiver unit 100 capable of implementing various aspects and embodiments of the invention. Receiver unit 100 may be implemented within a terminal (e.g., a cellular phone) or a base station. A terminal may also be referred to as a mobile station, a remote terminal, an access terminal, or some other terminology, and a base station may also be referred to as an access point, UTRAN, or some other terminology. Receiver unit 100 may also be used in various wireless communication systems such as, for example, IS-95, IS-2000, IS-856, W-CDMA, TS-CDMA, and GPS systems.

In FIG. 1, one or more RF modulated signals transmitted from one or more transmitters (e.g., base stations, GPS satellites, broadcast stations, and so on) are received by an antenna 112 and provided to a receiver 120, which is also referred to as a front-end unit or front-end circuitry. Within receiver 120, amplifier/filter 122 amplifies the received signal with one or more low noise amplifier (LNA) stages and further filters the amplified RF signal to remove noise and spurious signals.

A downconverter 124 then performs quadrature downconversion of the filtered RF signal from RF down to baseband (e.g., based on a heterodyne or a direct downconversion receiver design). The downconversion may be achieved by multiplying (or mixing) the filtered RF signal with a complex local oscillator (LO) signal to provide a complex baseband signal comprised of an inphase (I) component and a quadrature (Q) component.

Amplifier/filter 126 amplifies the I and Q baseband components to obtain the proper signal amplitude for quantization and further filters the amplified components to remove spurious signals and out-of-band noise. Analog-to-digital converters (ADCs) 128 then digitize the filtered I and Q components to provide I and Q samples, respectively. In a specific embodiment, ADCs 128 provide I and Q samples at two times the chip rate (i.e., chip×2), with the chip rate being 1.2288 Mcps for some CDMA systems. The pair of I and Q samples for each chip×2 sample period is referred to herein as an ADC sample or a data sample. The data samples may be stored to a sample buffer 130 for offline processing and/or provided directly to a digital signal processor (DSP) 140 for real-time processing.

DSP 140 may perform a number of functions such as filtering, resampling, demodulation, decoding, and so on. DSP 140 may also implement various control loops used to provide the proper sample timing and frequency control for each signal instance being processed, as described below. DSP 140 may also implement a rake receiver that can concurrently process multiple signal instances in the received signal.

Clock circuits 132 provide the clocks and LO signals used by various elements of receiver unit 100. For example, clock circuits 132 may be designed to provide the LO signal for downconverter 124 and the sampling clock for ADCs 128.

Controller 150 directs various operations of receiver unit 100 and may provide various controls for sample buffer 130, clock circuits 132, and/or DSP 140. For example, controller 150 may provide the controls to direct DSP 140 to acquire a pilot based on the data samples stored in sample buffer 130. A memory 152 provides storage for data and program codes for controller 150 and DSP 140.

In a typical RF receiver design, the conditioning of the received signal may be performed by one or more stages of amplifier, filter, mixer, and so on. In addition, these stages may be arranged in various configurations. For simplicity, the various signal conditioning stages are lumped together into the blocks shown in FIG. 1. Other RF receiver designs may also be used and are within the scope of the invention.

A terminal may be designed to operate in one of several modes, such as "active" and "standby", at any given moment. In the active mode, the terminal can actively exchange data with one or more base stations (e.g., for a voice or data call). And in the standby mode (which is also referred to as the "idle" mode), the terminal may monitor a paging channel for messages addressed to the terminal. Such messages may include those for alerting the terminal to the presence of an incoming call (i.e., page messages) and those for updating system parameters for the terminal (i.e., overhead messages).

Many terminals (e.g., cellular telephones) are portable and powered by an internal battery. The power consumption by the terminal in the idle mode decreases the available battery resources, which then shortens the "standby" time between battery recharges and the "talk" time when a call is placed or received. In the idle mode, a terminal continues to consume power to sustain the circuitry needed to monitor the messages transmitted from the base stations. Because a page message may be relatively long and can appear at any time, continual monitoring of the paging channel for page messages may significantly deplete battery power in the standby mode.

To reduce power consumption in the idle mode, messages on the paging channel may be sent to a terminal at designated times, if at all. In this way, the terminal only needs to wake up at the designated times to process any page messages that may have been transmitted.

To further reduce power consumption, a quick paging channel (QPCH) is used to indicate whether or not a page message may be transmitted on the paging channel for the terminal. The quick paging channel includes a number of paging indicator bits that are transmitted as binary On/Off bits. For IS-2000, each terminal is assigned two paging indicator bits for each (80 msec) QPCH slot, with the positions of the assigned paging indicator bits being determined based on a hashing function. The paging indicator bits may be detected more quickly, and if these bits indicate that no message will be transmitted on the paging channel for the terminal, then the terminal would not need to process the paging channel and may enter sleep. The quick paging channel and paging channel are thus designed such that the terminals need to be active for only a portion of the time to receive the page messages.

Figure 2A:
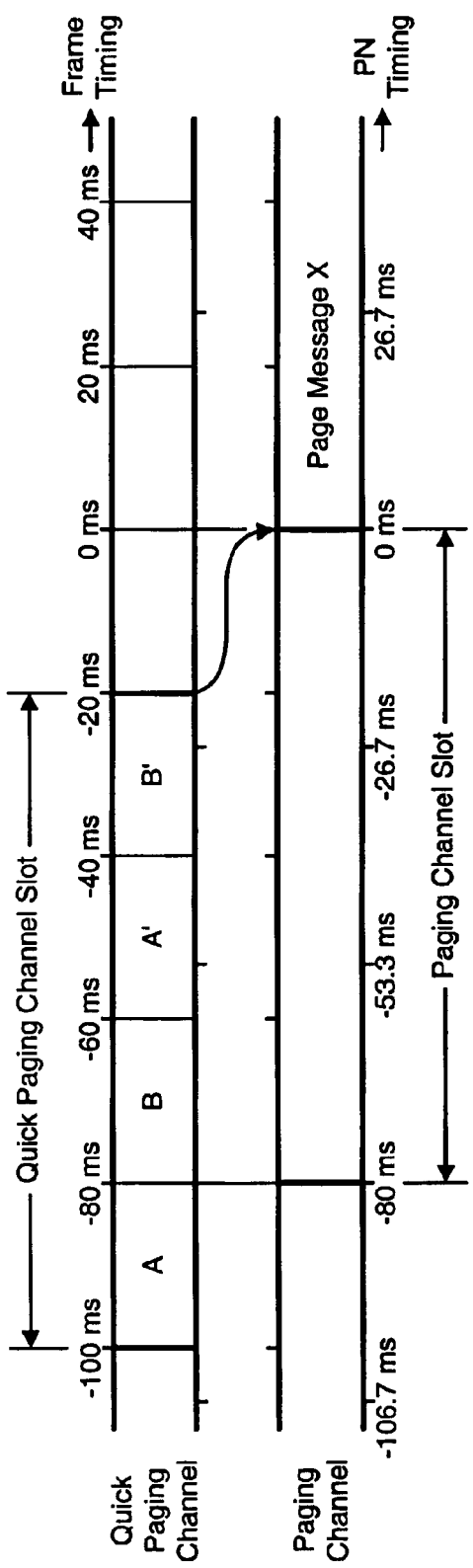
FIG. 2A is a diagram of a quick paging channel (QPCH) and a paging channel (PCH) defined by IS-2000.

FIG. 2A is a diagram of the quick paging channel (QPCH) and the paging channel (PCH) defined by IS-2000. For IS-2000, the paging channel is partitioned into PCH slots, each of which has a duration of 80 msec. Each PCH slot is further partitioned into four 20 msec frames. A group of terminals may be assigned to each PCH slot, with the assignment being based on some identification information for the terminals such as, for example, the International Mobile Subscriber ID (IMSI) which is unique for each terminal, the Mobile Identification Number (MIN), the Electronic Serial Number (ESN), or the Temporary Mobile Subscriber ID (TMSI). The paging channel may be used to transmit coded messages to "idle" terminals (i.e., those that have registered with the system but are in standby mode).

For IS-2000, the quick paging channel is partitioned into QPCH slots, each of which also has a duration of 80 msec. Each QPCH slot is further partitioned into four frames labeled as A, B, A', and B', and each frame includes either 96 or 192 paging indicator (PI) bits depending on whether 9.6 kbps or 19.2 kbps rate is used for the QPCH. Each PI bit is an On/Off keyed bit (i.e., a "0" or "1" bit value, with "0"=Off and "1"=On). Each registered terminal is assigned two PI bits for each assigned QPCH slot, with the assigned QPCH slots being the ones starting 100 msec before the assigned PCH slots. The position of each assigned PI bit is determined based on a defined hashing function and changes from bit to bit. Of the pair of PI bits assigned to a given terminal for each assigned QPCH slot, one PI bit is transmitted in frame A and the second PI bit is transmitted in frame A', or one PI bit is transmitted in frame B and the second PI bit is transmitted in frame B'. This transmission scheme ensures that the two PI bits are separated by a minimum of 20 msec, and that the second and later PI bit arrives a minimum of 20 msec before the start of the PCH slot associated with the QPCH slot.

The QPCH is used in conjunction with the PCH and functions like a control channel for the PCH. Each QPCH slot is associated with a corresponding PCH slot, but is transmitted 100 msec before the associated PCH slot. The PI bits on the QPCH are quick paging signals that alert the terminals that a coded page message is about to be transmitted on the PCH in the associated PCH slot.

When a base station sends a page to a terminal on the PCH (or requires the terminal to wake up to receive new configuration information), the base station turns "On" both PI bits assigned to the terminal for the QPCH slot. Since more than one terminal may hash to, and be assigned with, any given PI bit, detecting the assigned PI bits as "On" does not guarantee that the terminal will actually receive a page message (or configuration information) in the associated PCH slot. However, a PI bit detected as an "Off" bit may be interpreted to mean that the terminal does not need to process the associated PCH slot for paging or other information, which may greatly reduce power consumption since the page message is coded and may be long.

Figure 2B:
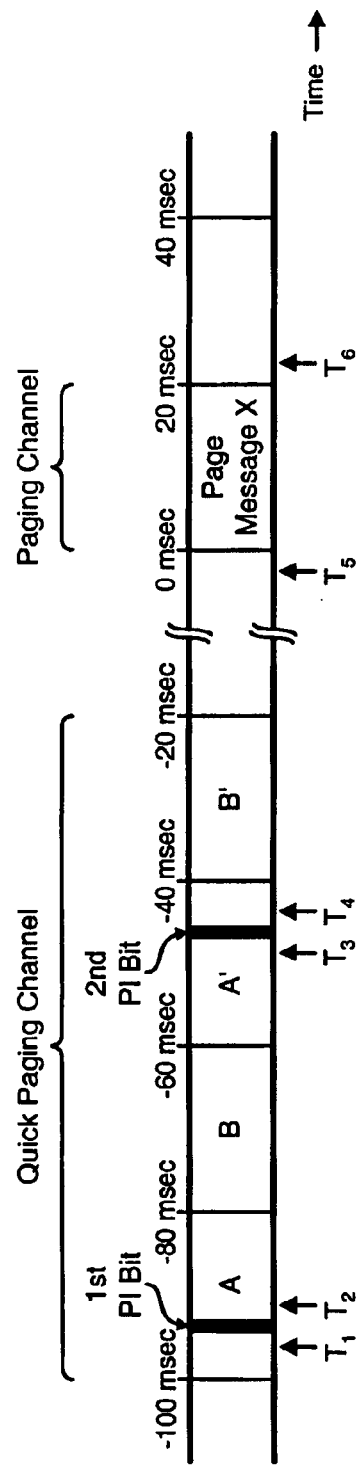
FIG. 2B is a diagram of a timeline for processing a slotted paging channel comprised of the QPCH and PCH.

FIG. 2B is a diagram of a timeline for processing a slotted paging channel comprised of the QPCH and PCH. For this slotted paging channel, the terminal periodically rather than continuously monitors the paging channel for messages from the base stations. At time $T_1$, the terminal wakes up from an "inactive" state prior to its first PI bit on the QPCH, enters an "active" state, conditions and digitizes the received signal, and stores the data samples to the sample buffer. The terminal further initiates processing of the data samples to acquire the pilot and recover the PI bit. At time $T_2$, transmission of the first PI bit for the terminal is completed, and the terminal enters an "offline" state to continue processing of the data samples. However, in the offline state, as much circuitry as possible (e.g., receiver 120 in FIG. 1) is powered down to conserve power. Upon completion of the processing of the first PI bit, the terminal may enter a "sleep" state whereby additional circuitry is powered down. For example, in the sleep state, only a precision oscillator, a sleep timer, and some other necessary circuitry may be kept active.

If the first PI bit indicates that no page message will be transmitted for the terminal in the next PCH slot (i.e., detected as an Off bit), then the terminal may remain in the sleep state until time $T_1$, prior to the first PI bit in the next assigned QPCH slot. Otherwise, if it cannot be determined for certain from the first PI bit that no page message will be transmitted for the terminal (e.g., if the first PI bit is detected as either an On bit or an erasure), then the terminal may wake up at time $T_3$ to process the second PI bit in similar manner as for the first PI bit. The terminal may enter the offline state at time $T_4$ to continue processing of the data samples while powering down the unnecessary circuitry (e.g., receiver 120). Again, the terminal may enter the sleep state upon completion of the processing of the second PI bit.

If the terminal needs to process the PCH, then it wakes up at time $T_5$ and processes the received signal to recover the page message transmitted on the PCH. Upon decoding the first frame of the page message, the terminal may be able to determine whether or not the message is addressed to it and/or if additional processing is required. If the terminal does not need to continue processing the PCH or perform any other actions, then it enters the sleep state at time $T_6$ until the next required wakeup time (which is the first PI bit in the next assigned QPCH slot).

To properly process the QPCH, PCH, or any other code channel, the terminal needs to acquire the frequency and timing of the signal instance being processed. This is typically achieved by processing the pilot for the signal instance using the frequency and timing control loops, as described below. For the processing of the PI bit, it is desirable to capture as small a window of data samples as possible so that the front-end circuitry (e.g., receiver 120) is powered up for as short a time period as possible. However, the frequency error in the data samples due to downconversion frequency error and/or Doppler frequency shift may be relatively large (e.g., especially after a sleep). In this case, a relatively long period of time may be required to acquire the frequency of the pilot.

In an aspect, techniques are provided to acquire the frequency of the pilot based on a window of data samples covering a time period shorter than the time needed by the frequency control loop to achieve frequency lock. This then allows the terminal to power down more circuitry for a longer period of time, which reduces power consumption and provides various other benefits.

Referring back to FIG. 2B, the terminal may be in the active state for a short time period covering a particular PI bit to be processed (e.g., between $T_1$ and $T_2$). During this time period, the received signal is conditioned and digitized, and a window of data samples for this PI bit may be stored to the sample buffer. Once the window of data samples has been saved, the front-end circuitry may be powered down, and the data samples may be retrieved and processed offline. In general, the time period when the received signal is sampled and stored may correspond to any data or message to be recovered by the terminal.

Figure 3:
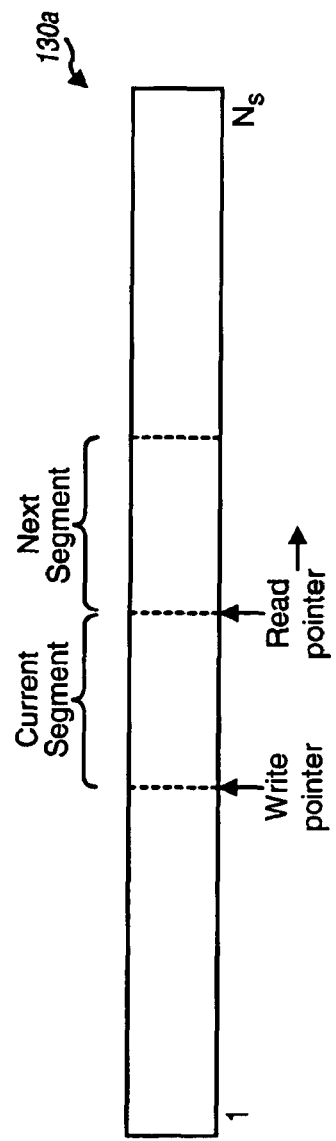
FIG. 3 is a diagram illustrating an embodiment of a sample buffer used to store a window of data samples.

FIG. 3 is a diagram illustrating an embodiment of a sample buffer 130a used to store a window of data samples. In this example, $N_S$ data samples are stored to the sample buffer, with the earliest (oldest) data sample being stored in location 1 and the latest (newest) data sample being stored in location $N_S$. The data samples are thereafter retrieved and processed in "segments", one segment at a time. Each segment includes $N_D$ data samples, where $N_D$ is the number of data samples needed to derive one or multiple pilot symbols.

A read pointer is used to indicate the starting location of the next segment of data samples to be processed. After a data segment has been retrieved from the sample buffer, the read pointer is moved to the right by the corresponding amount. When the read pointer reaches the last location $N_S$ of the sample buffer, it is moved back to the beginning of the sample buffer (i.e., location 1). In this way, the sample buffer is used as a circular buffer. $N_S$ may or may not be a multiple integer of $N_D$.

For some embodiments as described below, frequency-translated data samples may be stored back to the sample buffer for possible use in a subsequent iteration through the sample buffer. In this case, a write pointer is also maintained and points to the start of the current segment being processed. After the current segment of frequency-translated data samples has been stored back to the sample buffer, the write pointer is moved to the right by the corresponding amount. The write pointer also wraps around to the beginning of the sample buffer once it reaches the last location $N_S$.

Figure 4:
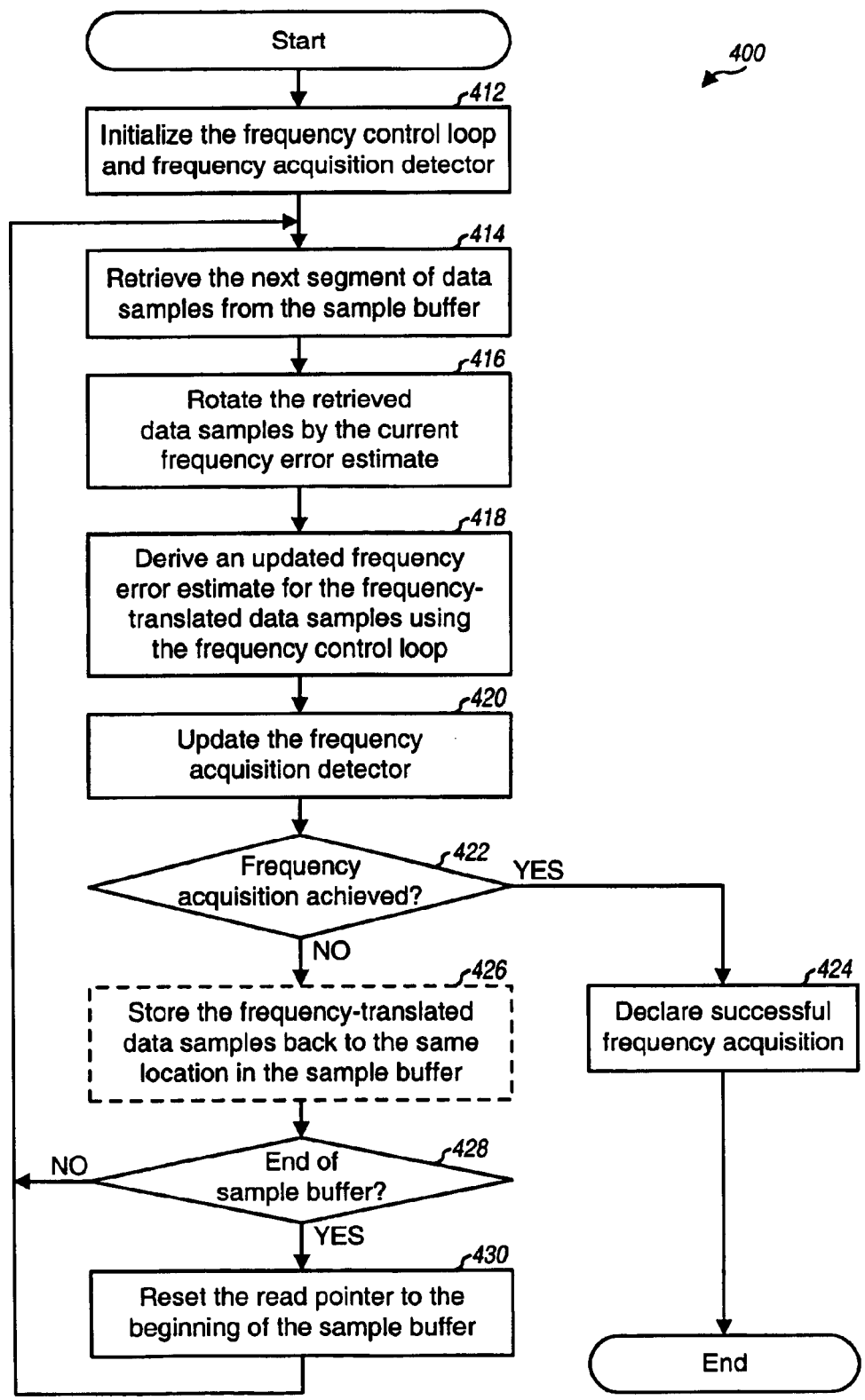
FIG. 4 is a flow diagram of an embodiment of a process for acquiring the frequency of a pilot based on a window of data samples.

FIG. 4 is a flow diagram of an embodiment of a process 400 for acquiring the frequency of a pilot based on a window of data samples. As described below, frequency and timing acquisition may both be concurrently performed on the data samples by two separate control loops. However, the timing acquisition is not shown or described in FIG. 4 for simplicity.

A frequency control loop (such as the one shown in FIGS. 5, 6A, and 6B and described in further detail below) may be used for the pilot frequency acquisition and typically includes a frequency discriminator coupled to a loop filter. A frequency acquisition detector may be used to determine whether or not frequency acquisition has been achieved. In an embodiment, a received signal strength indicator (RSSI) that can estimate the signal strength of the pilot is used as the frequency acquisition detector. In this case, frequency acquisition is determined based on the pilot strength estimate.

Initially, the frequency control loop and the frequency acquisition detector are both initialized, at step 412. This may be achieved by resetting a loop accumulator for the frequency control loop to zero, and initializing the RSSI to a low value (e.g., −30 dBm). The read and write pointers for the sample buffer are also reset to the beginning of the buffer.

Pilot frequency acquisition then commences by retrieving the next segment of data samples to be processed from the sample buffer and updating the read pointer, (step 414). The retrieved data samples are then rotated by the current frequency error estimate, Δf, to provide frequency-translated data samples (step 416). This may be achieved by performing a complex multiply of the retrieved data samples with a complex sinusoidal signal having a frequency of Δf (using a rotator). The frequency-translated data samples from the rotator are further processed (e.g., interpolated, despread, decovered, and accumulated, as described below) to provide one or more complex pilot symbols for the data segment.

The pilot symbols are then processed by the frequency control loop to derive an updated frequency error estimate (step 418). This may be achieved by first deriving a frequency error metric, Ferr, for the pilot symbols using the frequency discriminator and then filtering the frequency error metric with the loop filter. The frequency acquisition detector may (concurrently) be updated based on the pilot symbols (step 420). For the RSSI, the energy of each pilot symbol may be computed and accumulated with the current pilot strength estimate.

A determination is then made whether or not frequency acquisition has been achieved (step 422). If the RSSI is used as the frequency acquisition detector, then frequency acquisition may be declared if the output from the RSSI exceeds a particular threshold (e.g., 14 dBm). If frequency acquisition has been achieved, then a successful acquisition may be declared (e.g., by asserting a Freq_lock signal or some other indication) (at step 424), and the pilot frequency acquisition process terminates.

Otherwise, if frequency acquisition has not yet been achieved, then, for one embodiment, the frequency-translated data samples are stored back to the sample buffer at the same location where the corresponding data samples used to derive the frequency-translated data samples were stored (step 426). For an alternative embodiment, the frequency-translated data samples are not stored back to the sample buffer. Step 426 is thus optional and indicated as such by a dashed box in FIG. 4. A determination is next made whether or not the read pointer has reached the end of the sample buffer (step 428). If the answer is no, then the process returns to step 414 to process the next segment of data samples. Otherwise, if the end of the sample buffer has been reached, then the read and (possibly) write pointers are reset to the beginning of the sample buffer (step 430). The process then returns to step 414 to process the next data segment, which is at the start of the sample buffer. The frequency error estimate obtained by the frequency control loop at the end of the sample buffer is used as the starting frequency error estimate for the next iteration through the sample buffer.

As described below, the instantaneous frequency error estimate for each pilot symbol period may be derived based on two pilot symbols for two consecutive symbol periods. Since there may be a phase discontinuity between the last and first data samples stored in the sample buffer, when the read pointer is reset to the beginning of the sample buffer for the next iteration through the sample buffer, the frequency error estimate derived from the first pilot symbol for the current iteration and the last pilot symbol for the prior iteration may not be valid and is thus not used to update the loop filter. This is not shown in FIG. 4 for simplicity.

Although not shown in FIG. 4 for simplicity, the processing of the data samples may also be terminated if frequency acquisition is not achieved after cycling a specified maximum number of times through the sample buffer. A counter may be maintained and incremented after step 428. If the count value reaches the specified maximum number of iterations, then the processing can terminate and an acquisition failure may be declared.

As shown in FIG. 4, the same window of data samples may be retrieved and processed in an iterative manner, as many times as needed until the process is terminated by either a successful pilot acquisition or a failure. For each data segment, an improved estimate of the initial frequency error in the data samples from the ADCs is obtained by the frequency control loop. For the embodiment whereby the frequency-translated data samples are stored back to the sample buffer, the frequency error in these data samples reduces as the frequency error estimate improves. Upon achieving frequency acquisition, the frequency error in the frequency-translated data samples is small or near zero.

In the alternative embodiment, the frequency-translated data samples are not stored back to the sample buffer and step 426 in FIG. 4 may be omitted. For this embodiment, the frequency error estimate from the frequency control loop increases toward the initial frequency error in the data samples from the ADCs. Upon achieving frequency acquisition, the frequency error estimate from the frequency control loop is approximately equal to the initial frequency error, and the frequency error in the frequency-translated data samples is again small or near zero.

Once frequency lock has been achieved, the frequency-translated data samples may be demodulated and (possibly) decoded to recover the pertinent data. Offline processing for pages is described in further detail in U.S. patent application Ser. No. 09/172,067, entitled "Combined Searching and Page Monitoring Using Offline Sample Storage," filed Oct. 13, 1998, assigned to the assignee of the present application and incorporated herein by reference.

The data sample window size may be selected to be as small as possible to maximize power saving but large enough to provide high probability of frequency acquisition. The time required to achieve frequency acquisition is dependent on various factors such as the initial frequency error in the data samples, the bandwidth of the frequency control loop, the pilot strength or signal-to-noise-and-interference ratio (SNR), and so on. The data sample window size may be a fraction of the acquisition time while still providing good frequency acquisition performance. For example, a window of 4K data samples at chip×2 (i.e., covering 1.67 msec for a chip rate of 1.2288 Mcps) may be stored for offline pilot frequency acquisition.

The window size may also be variable and based on the estimated frequency error, pilot strength, and so on. For example, the window size for the first PI bit may be wider since the frequency error may be larger, and the window size for the second PI bit may be smaller than that for the first PI bit since the frequency error estimate from the first PI bit may be used to reduce the frequency error for the second PI bit. This may then result in a faster acquisition time and a smaller window size requirement.

The techniques for achieving frequency acquisition based on a window of data samples may be implemented based on various designs. One specific design is described below.

Figure 5:
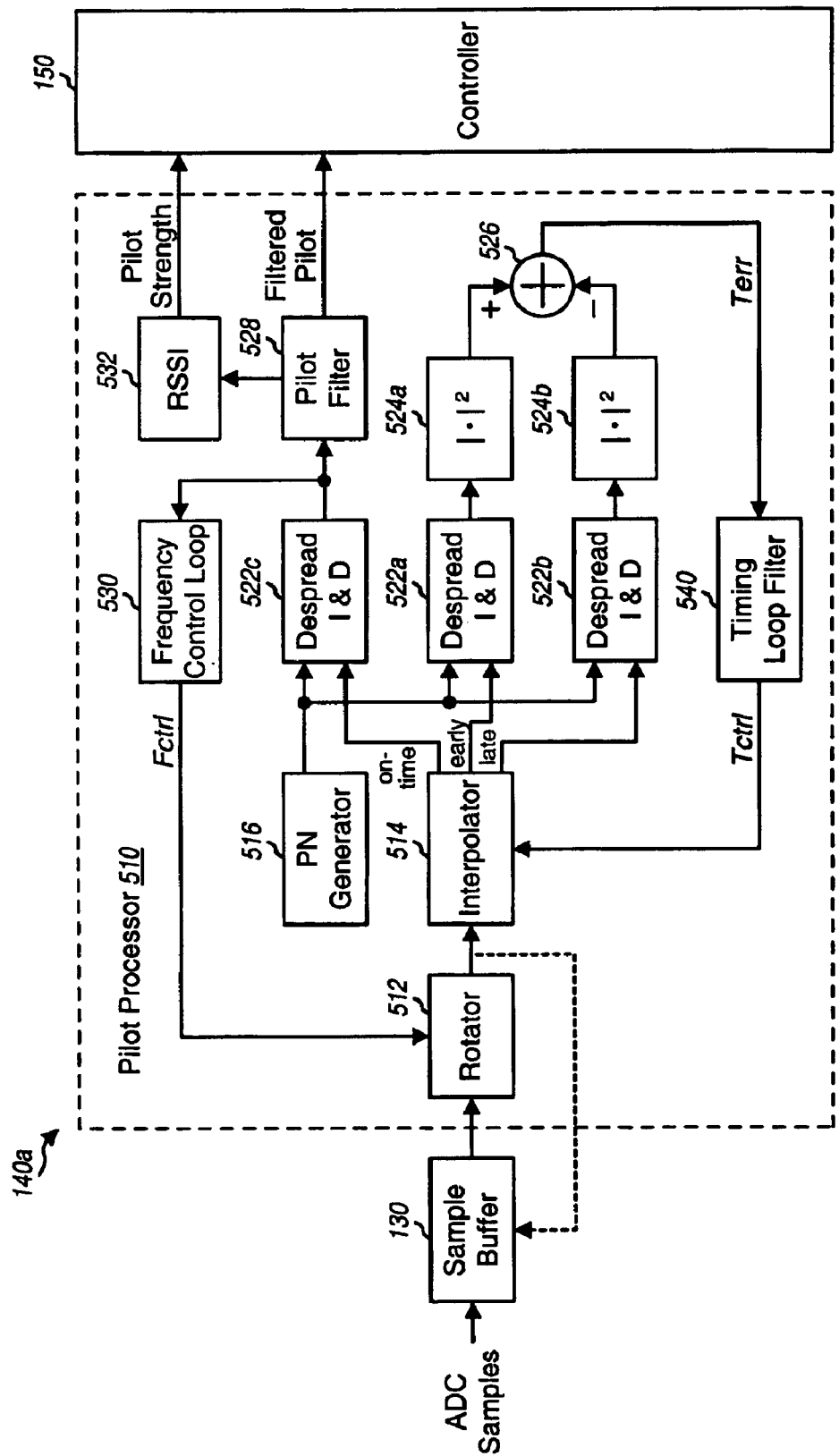
FIG. 5 is a block diagram of an embodiment of a DSP that may be used to acquire a pilot from a window of data samples.

FIG. 5 is a block diagram of an embodiment of a DSP 140a that may be used to acquire a pilot from a window of data samples. Referring back to FIG. 1, ADCs 128 may be operated to digitize and provide data samples for a specific time period. The window of data samples for this time period is stored in sample buffer 130 and may thereafter be retrieved and provided to one or more pilot processors 510 for processing (only one pilot processor is shown in FIG. 5 for simplicity).

In a multipath environment, each transmitted signal may be received via multiple signal paths, and the received signal may thus include multiple instances of a given transmitted signal. Each signal instance is associated with a respective amplitude, phase, and arrival time at the terminal. The window of data samples may thus include multiple signal instances (or multipath components) of one or more transmitted signals.

As noted above, DSP 140 may implement a rake receiver capable of concurrently processing multiple signal instances. The rake receiver typically includes a searcher and multiple finger processors. The searcher is typically used to search for strong signal instances in the received signal. Each finger processor may then be assigned to process a specific signal instance, with the amount of processing being dependent on the type of data or message being recovered (e.g., a paging indicator bit or a page message). Each finger processor may include a pilot processor 510 used to process the window of data samples to acquire the pilot for the assigned signal instance. Each finger processor typically further includes other elements used for data demodulation, which are not shown in FIG. 5 for simplicity.

FIG. 5 shows a specific embodiment of pilot processor 510. Within pilot processor 510, the data samples from sample buffer 130 are provided to a rotator 512, which performs a complex multiply of the data samples with a complex sinusoidal signal to provide frequency-translated (or rotated) data samples. The frequency of the complex sinusoidal signal is determined by a frequency control, Fctrl, which may be initialized to zero or some other value at the start of the frequency acquisition process. Rotator 512 may be used to remove phase rotation in the data samples due to downconversion frequency error and/or Doppler frequency shift in the signal instance being processed. The frequency of the complex sinusoidal signal used by rotator 512 is an estimate of the frequency error of the assigned signal instance, and may be determined by a frequency control loop 530.

An interpolator 514 then resamples the frequency-translated data samples to provide interpolated samples for the signal instance being processed. The resampling is performed based on a timing control, Tctrl, provided by a timing loop filter 540. This timing control indicates the specific time offset, $t_{adj}$, to be used for resampling the samples, and may be provided with a particular time resolution (e.g., chip×8 or $T_c/8$ resolution). For each chip period, interpolator 514 provides an "early" interpolated sample to a despread and integrate and dump (I & D) element 522a, a "late" interpolated sample to a despread I & D element 522b, and an "on-time" interpolated sample to a despread I & D element 522c. The on-time interpolated samples are approximations of the data samples that would have been provided by ADCs 128 had the sampling clock been aligned to the "optimum" sample timing, which is the timing that would have produced the highest SINR for the signal instance. The early and late interpolated samples are approximations of the data samples at $-T_c/2$ and $+T_c/2$, respectively, from the on-time sampling instants.

A PN generator 516 provides to each despread I & D element 522 a PN sequence having a specific PN state (or PN phase) corresponding to the arrival time of the signal instance being processed. This PN state may be determined by the searcher in its search for strong signal instances in the received signal and is then provided to PN generator 516. Each despread I & D element 522 then despreads its received interpolated samples with the PN sequence to provide despread samples, and further decovers the despread samples with the channelization code used for the pilot. For many CDMA systems, the channelization code for the pilot is a sequence of zeros (e.g., Walsh code zero), in which case the decovering may be omitted. Each despread I & D element 522 further accumulates (i.e., integrates) despread samples for a particular time duration to provide a complex pilot symbol, $P_I+jP_Q$. For a continuous pilot structure such as the ones used in IS-95 and IS-2000, the accumulation time duration may be an integer multiple of the channelization code length (i.e., 64·N, where N can be any integer). And for a gated pilot structure such as the ones used in IS-856 and W-CDMA, the accumulation time duration may correspond to each pilot burst (i.e., the time when the pilot is actually transmitted, which is a 96-chip period for each 1024-chip half-slot in IS-856) or a portion of the pilot burst.

The pilot symbols derived from the on-time interpolated samples are provided to a pilot filter 528 and filtered based on a particular lowpass filter response to provide a filtered pilot, which may be used for data demodulation and other purposes. The filtered pilot symbols from pilot filter 528 are provided to a receive signal strength indicator (RSSI) 532 and processed to provide an estimate of the signal strength of the pilot (which is also indicative of the pilot SINR since the total noise is known or can be ascertained). A specific design for RSSI 532 is described in further detail below.

The pilot symbols derived from the on-time interpolated samples are used by frequency control loop 530 to derive the frequency control, Fctrl, for rotator 512. In particular, within frequency control loop 530, the pilot symbols from despread I & D element 522c are provided to a frequency discriminator and used to derive a frequency error metric, Ferr, which is an estimate of the instantaneous error in the frequency of the signal instance being processed. A loop filter then filters the frequency error metric to provide the frequency control, Fctrl, which is then provided to rotator 512. Frequency control loop 530 is described in further detail below.

The pilot strength estimate is provided to controller 150 and may be used to determine whether or not the frequency of the pilot has been acquired by the frequency control loop. In particular, pilot frequency acquisition may be determined by comparing the pilot strength estimate from RSSI 532 against a threshold value (e.g., −14 dBm) and declaring frequency acquisition if the pilot strength estimate exceeds this threshold value.

The pilot symbols derived from the early and late interpolated samples are used by a delay lock loop (DLL) to derive the timing control, Tctrl, for interpolator 514. In particular, the pilot symbols from despread I & D elements 522a and 522b are provided to a timing discriminator (e.g., an early/late detector) and used to derive a timing error metric, Terr, which is an estimate of the instantaneous error in the sample timing for the signal instance being processed. Timing loop filter 540 then filters the timing error metric and further quantizes the loop output to provide the timing control, Tctrl.

For the embodiment shown in FIG. 5, the timing discriminator includes magnitude squarers 524a and 524b and a summer 526. Magnitude squarers 524a and 524b receive the pilot symbols from despread I & D elements 522a and 522b, respectively. Each magnitude squarer 524 computes the energy, $E_P$, of each pilot symbol as $E_P = P_I^2 + P_Q^2$. Magnitude squarer 524a then provides the early pilot energy, $E_{P,early}$, derived based on the early interpolated samples, and magnitude squarer 524b provides the late pilot energy, $E_{P,late}$, derived based on the late interpolated samples. A summer 526 then subtracts the late pilot energy from the early pilot energy and provides the difference (i.e., $E_{P,early} - E_{P,late}$) to timing loop filter 540. Other types of timing discriminator may also be used for the timing control loop, as is known in the art.

The output from the timing discriminator (or summer 526) is the timing error metric, Terr, which is an estimate of the instantaneous error in the sample timing for a given data sample. This timing error metric is then filtered by timing loop filter 540 to provide an output indicative of the fine-grain error, $t_{diff}$, between the ADC sampling instants and the "optimum" sampling instants for this signal instance. Timing loop filter 540 then quantizes the fine-grain timing error, $t_{diff}$, to provide a coarse-grain time offset, $t_{adj}$, that is used for resampling the frequency-translated data samples. Timing loop filter 540 then provides to interpolator 514 the timing control, Tctrl, indicative of this time offset, $t_{adj}$.

Figure 6A:
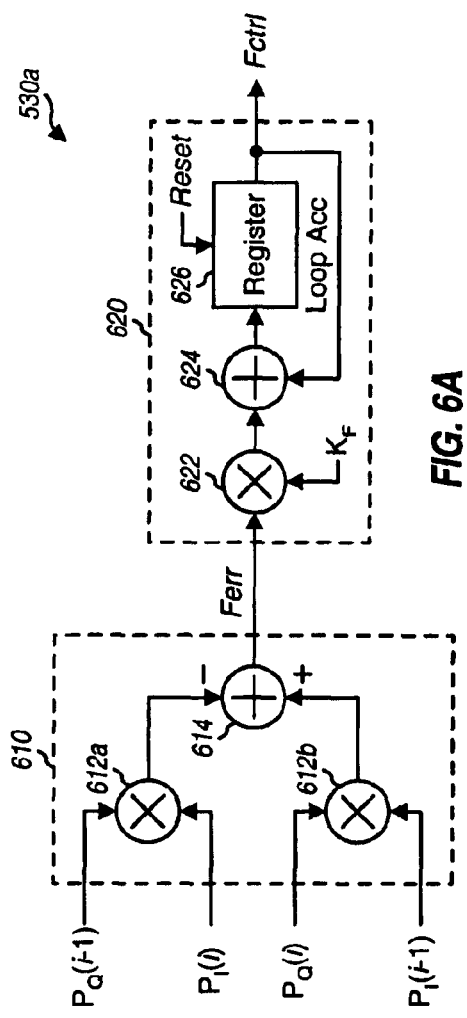
FIGS. 6A, 6B, and 6C are block diagrams of an embodiment of a frequency control loop, a rotator, and a received signal strength indicator (RSSI), respectively.

FIG. 6A is a block diagram of a frequency control loop 530a that may be used to acquire the frequency of a pilot from a window of data samples. Frequency control loop 530a is one embodiment of frequency control loop 530 in FIG. 5, and includes a frequency discriminator 610 and a loop filter 620.

In the embodiment shown in FIG. 6A, frequency discriminator 610 receives a pair of consecutive complex pilot symbols, $P_I(i) + jP_Q(i)$ and $P_I(i-1) + jP_Q(i-1)$, from despread I & D elements 522c, which are derived based on the on-time interpolated samples. Frequency discriminator 610 then derives the frequency error metric, Ferr, for these pilot symbols. In particular, within frequency discriminator 610, a multiplier 612a receives and multiplies the imaginary part of the previous pilot symbol, $P_Q(i-1)$, with the real part of the current pilot symbol, $P_I(i)$, and provides the product to a summer 614. A multiplier 612b similarly receives and multiplies the real part of the previous pilot symbol, $P_I(i-1)$, with the imaginary part of the current pilot symbol, $P_Q(i)$, and also provides the product to summer 614. Summer 614 then subtracts the product of multiplier 612a from the product of multiplier 612b and provides the frequency error metric, Ferr. Other types of frequency discriminator may also be used, and this is within the scope of the invention.

In the embodiment shown in FIG. 6A, loop filter 620 implements a first-order loop filter for the frequency control loop. Loop filter 620 includes a single accumulator implemented with a summer 624 and a register 626. The loop filter input (which is the frequency error metric, Ferr, from frequency discriminator 610) is initially scaled with a scaling factor, $K_F$, by a multiplier 622, and the scaled value is then accumulated by the loop accumulator. The output from the accumulator comprises the frequency control loop output, Fctrl, which is provided to rotator 512. This loop output is an estimate of the frequency error, $\Delta f$, of the data samples.

Other designs that may be used for the frequency discriminator and loop filter are described in numerous references available in the art. One such reference is a book by A. J. Viterbi, entitled "Principles of Spread Spectrum Multiple Access Communications," $2^{nd}$ Ed., McGraw Hill, 1977, which is incorporated herein by reference.

Figure 6B:
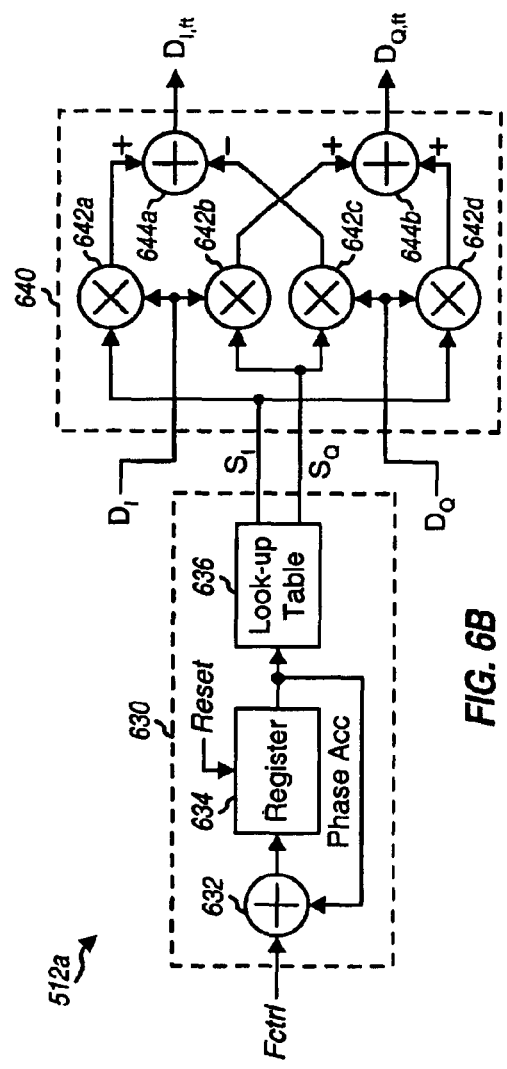

FIG. 6B is a block diagram of an embodiment of a rotator 512a, which may be used to perform a complex multiply of each data sample, $D_I + jD_Q$, with a corresponding sinusoidal signal sample, $S_I + jS_Q$, to provide a frequency-translated data sample, $D_{I,ft} + jD_{Q,ft}$. Rotator 512a is one embodiment of rotator 512 in FIG. 5 and includes a signal generator 630 and a complex multiplier 640.

Signal generator 630 receives the frequency control loop output, Fctrl, and provides a sinusoidal signal having a frequency indicated by the loop output. In this embodiment, signal generator 630 includes a phase accumulator, which is implemented with a summer 632 and a register 634, and a look-up table 636. For each data sample to be rotated, the accumulator accumulates the loop output, Fctrl, which is a frequency value, to obtain a phase value for that data sample. The phase value is then provided to look-up table 636, which then provides a complex value (i.e., cosine and sine values) corresponding to the received phase value. The series of complex values provided by the look-up table forms the sinusoidal signal used to rotate the data samples retrieved from the sample buffer.

Within complex multiplier 640, the real part of the complex data sample, $D_I$, is provided to multipliers 642a and 642b, and the imaginary part of the data sample, $D_Q$, is provided to multipliers 642c and 642d. Multipliers 642a and 642d also receive the real part of the sinusoidal signal, $S_I$, and multipliers 642b and 642c also receive the imaginary part of the sinusoidal signal, $S_Q$. Each multiplier 642 multiplies the two received parts and provides a respective product. A summer 644a receives and subtracts the product of multiplier 642c from the product of multiplier 642a to provide the real part of the frequency-translated data sample, $D_{I,ft}$. A summer 644b receives and sums the products of multipliers 642b and 642d to provide the imaginary part of the frequency-translated data sample, $D_{Q,ft}$.

Figure 6C:
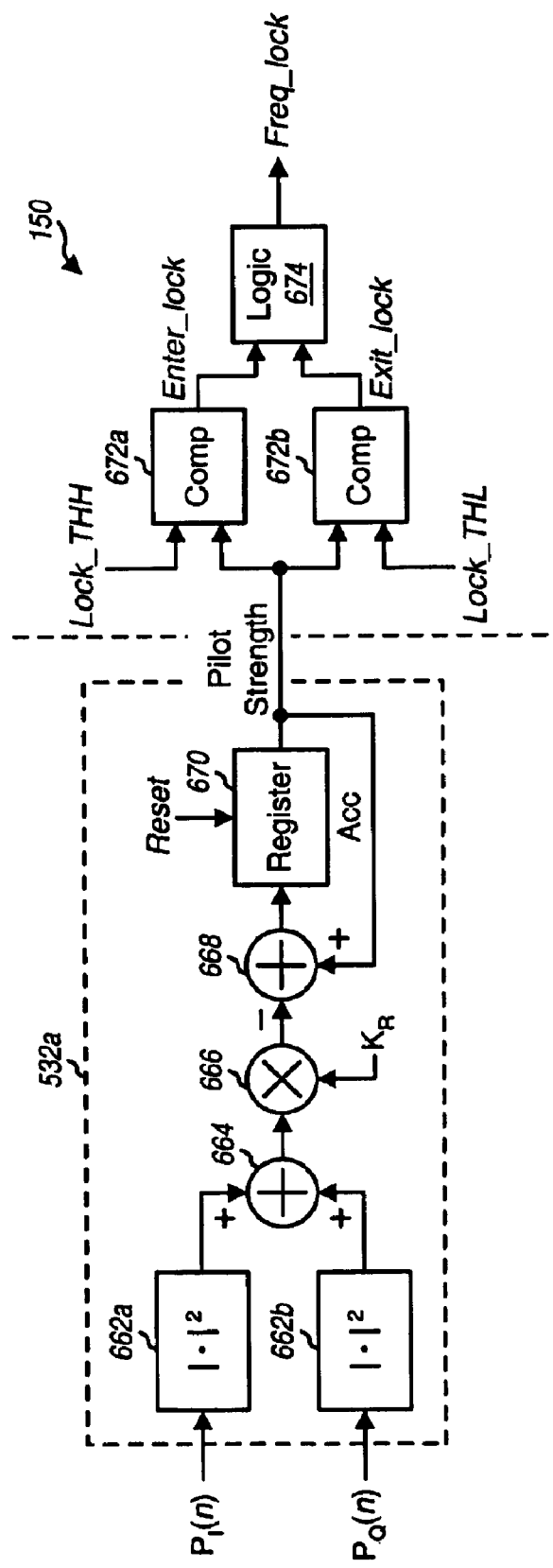

FIG. 6C is a block diagram of an RSSI 532a, which is a specific embodiment of RSSI 532 in FIG. 5. RSSI 532a provides an estimate of the pilot strength, which may be used to determine whether or not frequency acquisition has been achieved for the pilot.

In one embodiment, the pilot strength, $RSS_P$, may be estimated as:

$$RSS_P = K_R \sum_i^{N_E} \{P_I^2(i) + P_Q^2(i)\}, \quad \text{Eq (1a)}$$

where $P_I(i)$ and $P_Q(i)$ are respectively the real and imaginary parts of the pilot symbol for the i-th pilot symbol period derived from the on-time interpolated samples, $N_E$ is the number of pilot symbols to be accumulated to derive the pilot strength estimate, and $K_R$ may be selected as $K_R=1/N_E$.

In another embodiment, the pilot strength, $RSS_P$, may be estimated as:

$$RSS_P = K_R \sum_i^{N_E} \{|P_I(i)| + |P_Q(i)|\}. \quad \text{Eq (1b)}$$

Other techniques may also be used to estimate the pilot strength, and this is within the scope of the invention.

For RSSI, the embodiment shown in FIG. 6C, the pilot strength is estimated based on equation (1a). The real part, $P_I(i)$, and the imaginary part, $P_Q(i)$, of the pilot symbol are squared by magnitude squarers 662a and 662b, respectively, and the squared values are summed by a summer 664 to provide the pilot energy for the i-th pilot symbol. The pilot energy is then scaled by a gain $K_R$ by a multiplier 666 and the scaled pilot energy is accumulated by an accumulator comprised of a summer 668 and a register 670. The accumulator performs accumulation over a particular time duration (e.g., $N_E$ pilot symbols). The output from the accumulator is indicative of the pilot strength, which is provided to controller 150.

In an embodiment, within controller 150, the pilot strength is compared against an upper lock threshold, Lock_THH, by a comparator (Comp) 672a and also against a lower lock threshold, Lock_THL, by a comparator 672b. Comparator 672a provides a status signal, Enter_lock, which transitions to logic high if the pilot strength exceeds the upper lock threshold. Correspondingly, comparator 672b provides a status signal, Exit_lock, which transitions to logic high if the pilot strength falls below the lower lock threshold. A logic unit 674 receives the status signals from comparators 672a and 672b and provides a status signal, Freq_lock, which is logic high if frequency acquisition has been achieved. The Freq_lock signal (1) transitions to logic high whenever the Enter_lock signal transitions to logic high, and (2) remains at logic high until the Exit_lock signal transitions to logic high. This lock detector design provides hysteresis so that the Freq_lock signal does not continually toggle between the frequency lock and unlock states.

RSSI 532a may be initialized to a low value (e.g., −30 dBm) at the start of the pilot frequency acquisition using the Reset signal. Thereafter, the accumulator within RSSI 532a used to estimate the pilot strength is updated as each pilot symbol is received. If the frequency error of the frequency-translated data samples is relatively large, then the magnitude of the pilot symbols will be smaller because of the coherent accumulation of these data samples over the accumulation time duration by despread I & D element 522c. The smaller amplitude pilot symbols will then result in a corresponding smaller pilot strength estimate from RSSI 532a. Conversely, if the frequency error of the frequency-translated data samples is relatively small or near zero, then the magnitude of the pilot symbols will be larger and the pilot strength estimate will be correspondingly larger.

The frequency acquisition may be achieved based on a continuous pilot, such as the ones transmitted in IS-95 and IS-2000 systems. In this case, the window of data samples may be partitioned into adjoining (or possibly non-adjoining) segments, and each segment may be retrieved and processed in sequential order.

The frequency acquisition may also be achieved based on a gated pilot, such as the ones transmitted in IS-856 and W-CDMA systems. In this case, only "pertinent" data samples that may be used to derive a frequency error estimate are retrieved and processed, and remaining data samples may be omitted. These pertinent data samples are typically those for the time period when the gated pilot is transmitted (e.g., the data samples for the 96-chip pilot burst in each 1024-chip half-slot in IS-856). For a gated pilot transmission scheme, higher transmit power is typically used for the pilot bursts and/or data transmission on other code channels may be gated off during the pilot bursts. In this case, the coherent accumulation interval (for despread I & D element 522c) may be selected to be shorter so that more pilot symbols may be available for offline processing without drastically degrading the quality of each pilot symbol. For example, the accumulation interval may be selected to be 32, 16, 8, or even fewer chips for the gated pilot in IS-856.

For simplicity, the frequency acquisition is described above based on a recovered pilot. Frequency acquisition may also be achieved based on recovered data symbols, or a combination of pilot and data symbols, and this is within the scope of the invention.

The techniques described herein whereby a window of data samples is iteratively processed to achieve acquisition may be used for various types of loops. For example, these techniques may be used for frequency acquisition (as described in detail above), timing acquisition, gain control, and so on. These techniques may also be used for general parameter estimation, where the window of data samples may be used to improve the accuracy of the estimate for the parameter because of availability of anti-causal information. For example, it may be possible to use future information to better estimate inter-symbol interference (ISI) through equalization techniques. In general, the techniques described herein allows a (relatively) small window of data samples to be used to achieve acquisition for a loop that normally requires a longer period of time to converge or achieve lock (i.e., the acquisition time is longer than the data sample window size).

For example, the techniques described herein may also be used to iteratively process a window of data samples to acquire the timing of a signal instance. As shown in FIG. 5, the frequency and timing control loops can concurrently operate on the data samples to acquire frequency and timing, respectively. The timing control loop may be able to achieve lock in a shorter period of time if the initial timing error, $t_{err}$, is small. The searcher is typically able to provide an initial timing estimate with an error of less than half a chip, or $t_{err} \leq T_c/2$. If the time required to achieve timing acquisition is longer than the window size, then the data samples in the sample buffer may similarly be reused to perform the timing acquisition.

The frequency control loop may be able to acquire frequency based on the window of data samples even if the timing control loop cannot achieve timing lock (e.g., because the window size is insufficient). In one alternative method to obtain timing, the window of data samples is searched at the smallest resolution possible (e.g., chip×8 or $T_c/8$). Finger processors are then assigned based on the result of the search and would begin demodulation. In another alternative method, the window of data samples is searched at a coarser resolution ($T_c/2$) and then interpolate to a finer resolution. Again, finger processors are assigned based on the result of the search.

The techniques described herein may be implemented by various means. For example, these techniques may be implemented in hardware, software, or a combination thereof. For a hardware implementation, the control loop and support circuitry may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. A DSP may also be designed with the capability to implement multiple (frequency and/or timing) control loops in parallel or in a time division-multiplexed (TDM) manner.

For a software implementation, the control loop and/or support elements may be implemented with modules (e.g., procedures, functions, and so on) that perform the functions described herein. The software codes may be stored in a memory unit (e.g., memory 152 in FIG. 1) and executed by a processor (e.g., controller 150). The memory unit may be implemented within the processor or external to the processor, in which case it can be communicatively coupled to the processor via various means as is known in the art.

The control loop may also be implemented with a combination of hardware and software. For example, hardware may be used to derive the pilot symbols, and software may be used to implement the frequency discriminator and loop filter.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device operable to acquire frequency of a signal instance received in a wireless communication system, comprising:
a rotator operative to receive a segment of data samples and rotate the data samples by a current frequency error estimate to provide frequency-translated data samples, wherein the segment of data samples is a portion of a window of data samples having included therein the signal instance;
a sample buffer operative to store the window of data samples; and
a frequency control loop operative to derive an updated frequency error estimate based on the frequency-translated data samples, wherein the rotator and frequency control loop are operative to process the window of data samples a plurality of times until the frequency acquisition is achieved for the signal instance or a termination is reached, wherein the frequency-translated data samples are stored in the sample buffer in place of the data samples.

2. The device of claim 1, wherein the duration of time covered by the window of data samples is shorter than the duration of time required by the frequency control loop to acquire the frequency of the signal instance.

3. The device of claim 1, wherein the window of data samples is processed one segment at a time and in a sequential order, from start to end of the window, for each of the plurality of times.

4. The device of claim 1, further comprising:
a despreader operative to process the data samples in the segment to recover a pilot for the signal instance, and wherein the updated frequency error estimate is derived based on the recovered pilot.

5. The device of claim 1, wherein the frequency control loop includes
a frequency discriminator operative to determine a frequency error metric based on one or more pilot symbols obtained for the segment of data sample, and
a loop filter operative to filter the frequency error metric to provide the updated frequency error estimate.

6. The device of claim 1, further comprising:
a frequency acquisition detector operative to detect for frequency acquisition based on the frequency-translated data samples.

7. The device of claim 6, wherein the frequency acquisition detector includes a received signal strength indicator (RSSI).

8. The device of claim 1, wherein the wireless communication system is a CDMA system.

9. The device of claim 1, wherein the window of data samples covers a paging indicator (PI) bit for a quick paging channel.

10. A device operable to acquire a parameter of a signal instance received in a wireless communication system, comprising:
a processing unit operative to receive a segment of data samples and process the data samples in accordance with a current error estimate to provide corrected data samples, wherein the segment of data samples is a position of a window of data samples having included therein the signal instance;
a sample buffer operative to store the window of data samples; and
a control loop operative to derive an updated error estimate based on the corrected data samples, wherein the processing unit and control loop are operative to process the window of data samples a plurality of times until the frequency acquisition of the parameter is achieved for the signal instance or a termination is reached,
wherein the corrected data samples are stored in the sample buffer in place of the segment of data samples.

11. The device of claim 10, wherein the parameter to be acquired is frequency.

12. The device of claim 10, wherein the parameter to be acquired is sample timing.

13. The device of claim 10, wherein the duration of time covered by the data sample window is shorter than the duration of time required by the control loop to acquire the parameter.

14. An apparatus in a wireless communication system, comprising:
means for rotating a segment of data samples in accordance with a current frequency error estimate to provide frequency-translated data samples, wherein the segment of data samples is a portion of a window of data samples having included therein a signal instance whose frequency is to be acquired;
means for storing the window of data samples; and
means for deriving an updated frequency error estimate based on the frequency-translated data samples, wherein the means for rotating and means for deriving are configured to operate on the window of data samples a plurality of times until the frequency acquisition is achieved for the signal instance or a termination is reached, wherein the frequency-translated data samples are stored in the means for storing the window of data samples in place of the data samples.

15. The device of claim 14, wherein the means for deriving includes means for determining a frequency error metric based on one or more pilot symbols obtained for the segment of data samples, and means for filtering the frequency error metric to provide the updated frequency error estimated.

16. A method of acquiring frequency of a signal instance received in a wireless communication system, comprising:

receiving a segment of data samples for processing from a sample buffer, wherein the segment of data samples is a portion of a window of data samples having included therein the signal instances;

rotating the data samples an accordance with a current frequency error estimate so provide frequency-translated data samples;

storing the frequency-translated data samples in the sample buffer in place of the segment of data samples;

deriving an updated frequency error estimate based on the frequency-translated data samples; and repeating the receiving rotating, storing, and deriving a plurality of times through the window of data samples until the frequency acquisition is achieved for the signal instance or a termination is reached.

17. The method of claim 16, wherein the deriving includes processing the data samples to provide one or more pilot symbols, determining a frequency error metric based on the one or more pilot symbols, and filtering the frequency error metric to provide the updated frequency error estimate.

18. The method of claim 16, further comprising:

determining the frequency acquisition based on the frequency-translated data samples.

19. A method of acquiring frequency of a signal instance in a CDMA communication system, comprising:

receiving a segment of data samples for processing from a sample buffer, wherein the segment of data samples is a portion of a window of data samples having included therein the signal instance, and wherein the duration of time covered by the window is shorter than the time required to achieve frequency acquisition;

rotating the data samples in accordance with a current frequency error estimate to provide frequency-translated data samples;

storing the frequency-translated date samples in the sample buffer in place of the segment of data samples;

processing the frequency-translated data samples to provide one or more pilot symbols;

deriving an updated frequency error estimate based on the one or more pilot symbols; and repeating the receiving, rotating, storing, processing, and deriving a plurality of times through the window of data samples until the frequency acquisition is achieved for the signal instance or a termination is reached, wherein the window of data samples is processed one segment at a time and in a sequential order, from start to end of the window, for each of the plurality of times.

20. A method of recovering a paging indicator (PI) bit for a quick paging channel in a CDMA communication system, comprising:

storing a window of data samples covering the PI bit;

powering down front-end circuitry after the window of data samples has been stored;

acquiring frequency of a signal instance by processing the window of data samples to create frequency-translated data samples a plurality of times until the frequency acquisition is achieved for the signal instance; and processing the frequency-translated data samples for the signal instance to recover the PI bit.

21. The method of claim 20, wherein the frequency acquisition and the recovery of the PI bit are performed offline with the front-end circuitry powered down.

22. A computer program product for acquiring a frequency of a signal instance received in a wireless communication system, comprising:

code for receiving a segment of data samples for processing from a sample buffer, wherein the segment of data samples is a portion of a window of data samples having included therein the signal instance;

code for rotating the data samples in accordance with a current frequency error estimate to provide frequency-translated data samples;

code for storing the frequency-translated data samples in the sample buffer in place of the segment of data samples;

code for deriving an updated frequency error estimate based on the frequency-translated data samples;

code for repeating the receiving, relating, storing, and deriving a plurality of times through the window of data samples until the frequency acquisition is achieved for the signal instance or a termination is reached; and a computer-usable medium for storing the code for receiving, the code for rotating, the code for storing, the code for deriving and the code for repeating.

23. A device in a wireless communication system, comprising:

a sample buffer operative to store a window of data samples for a received signal;

a front-end unit operative to process the received signal to provide the window of data samples; and a digital signal processor including a rotator operative to receive and rotate a segment of data samples in accordance with a current frequency error estimate for a signal instance in the received signal to provide frequency-translated data samples, wherein the segment of data samples is a position of the window of data samples, and a frequency control loop operative to derive an updated frequency error estimate based on the frequency-translated data samples, wherein the rotator and frequency control loop are operative to process the window of data samples a plurality of times until the frequency acquisition is achieved for the signal instance or a termination is reached;

wherein the front-end unit is powered down after the window of data samples has been obtained, and wherein the digital signal processor is operative to perform the frequency acquisition offline with the front-end unit powered down.

24. A computer program product for acquiring a frequency of a signal instance received in a wireless communication system, comprising:

code for receiving a segment of data samples for processing, wherein the segment of data samples is a portion of a window of data samples having included therein the signal instance;

code for powering down a front-end unit after the window of data samples has been received;

code for rotating the data samples in accordance with a current frequency error estimate to provide frequency-translated data samples;

code for deriving an updated frequency error estimate based on the frequency-translated data samples;

code for repeating the receiving, rotating, and deriving a plurality of times through the window of data samples until the frequency acquisition is achieved for the signal instance or a termination is reached; and a computer-usable medium for storing the code for receiving, the code for rotating, the code for storing, the code for deriving and the code for repeating.

25. An apparatus in a wireless communication system, comprising:

means for processing a received signal to provide a window of data samples;

means for rotating a segment of data samples in accordance with a current frequency error estimate to provide frequency-translated data samples, wherein the segment of data samples is a portion of the window of data samples having included therein a signal instance to be processed;

means for deriving an updated frequency error estimate based on the frequency-translated data samples, wherein the means for rotating and means for deriving are configured to operate on the window of data samples a plurality of times until a frequency acquisition is achieved for the signal instance or a termination is reached, and means for powering down the means for processing the received signal after the window of data samples has been obtained.

* * * * *